United States Patent [19]

Egli et al.

[11] Patent Number: 4,672,562

[45] Date of Patent: Jun. 9, 1987

[54] METHOD AND APPARATUS FOR DETERMINING LOCATION AND ORIENTATION OF OBJECTS

[75] Inventors: Werner H. Egli, Minneapolis; John W. Miller, St. Paul; Jeffrey M. Setterholm, Minnetonka, all of Minn.

[73] Assignee: Honeywell Inc., Minneapolis, Minn.

[21] Appl. No.: 680,442

[22] Filed: Dec. 11, 1984

[51] Int. Cl.⁴ .................. G01B 11/26; G01S 13/00
[52] U.S. Cl. ........................ 364/559; 358/107; 364/516; 364/525
[58] Field of Search ............. 364/516, 525, 550, 559; 358/107, 903; 356/138, 152, 153, 363; 250/561

[56] References Cited

U.S. PATENT DOCUMENTS

| | | | |
|---|---|---|---|
| 3,769,442 | 10/1973 | Heartz et al. | 364/516 |
| 3,793,481 | 2/1974 | Ripley et al. | 358/107 |
| 3,922,533 | 11/1975 | Royal | 364/516 |
| 4,238,828 | 12/1980 | Hay et al. | 364/516 |
| 4,360,885 | 11/1982 | Edgar | 364/525 |
| 4,396,945 | 8/1983 | DiMatteo et al. | 358/107 |
| 4,453,224 | 6/1984 | Crooks, Jr. | 364/525 |
| 4,471,448 | 9/1984 | Williams | 364/559 |
| 4,545,576 | 10/1985 | Harris | 364/516 |

FOREIGN PATENT DOCUMENTS 2420204  7/1975  Fed. Rep. of Germany ...... 364/559

*Primary Examiner*—Gary Chin
*Assistant Examiner*—Kevin J. Teska
*Attorney, Agent, or Firm*—Robert A. Pajak

[57] ABSTRACT

An orthogonally related target point array is provided in fixed relationship to an object. A photo detector image plane obtains images of the target points projected through a lens located a fixed distance from the image plane. Simple algebraic manipulation of image plane position coordinates of the images corresponding to the target points provides for the establishment of a vector replica of the target point array. The vector replica, in turn, is sufficient data to provide spatial information about the object including position and orientation information with full six-degrees-of-freedom.

26 Claims, 2 Drawing Figures

METHOD AND APPARATUS FOR DETERMINING LOCATION AND ORIENTATION OF OBJECTS

BACKGROUND OF THE INVENTION

The present invention relates to a six degrees-of-freedom tracking system by which spatial information, including the location (X,Y,Z) and orientation (roll, pitch, yaw) about an object in space (for example a robot arm, platform, or a helmet in an aircraft) can be accurately determined by electro-optical means. The invention has application either in open-loop position locating systems or in closed-loop control systems.

Prior Art systems include, among others, those shown in U.S. Pat. No. 4,396,945, entitled "Method of Sensing the Position and Orientation of Elements in Space" issued to Paul DiMatteo, et al and U.S. Pat. No. 4,238,828, entitled "Position Detecting Apparatus" issued to Andrew G. Hay, et al. The systems described in the above referred to patents include a plurality of target spots or points in fixed relationship to an object whose position is to be monitored. One or more cameras, having a field of view of the target spots, are provided to obtain a projection of the target points on one or more two dimensional image planes. Means are provided to generate signals representative of the two dimensional position coordinates of the image points on the image planes corresponding to the target points. From the position coordinate information of the image points corresponding to the target points, an analytical processor provides spatial information about the object relative to the image plane coordinate frame.

The arrangement of the target spots determines in part the mathematical processes to obtain position information. Heretofore, prior art systems include the solution of a plurality of simultaneous equations usually in quadratic or higher order forms. The four non-coplanar point array shown in U.S. Pat. No. 4,238,828, is computationally cumbersome since six quadratic simultaneous equations must be solved to obtain a solution. Still, in other solutions, a simultaneous set of quadratic equations must be solved. Accordingly, processer times and complexity of the processer increases with such solutions.

A BRIEF DESCRIPTION OF THE INVENTION

An array of target points, in fixed relation to an object, comprises at least first, second, third, and fourth target points. The fourth target point forms a common intersection point of first, second, and third line projections passing separately through the first, second, and third target points, respectively, and intersecting at the fourth target point. Further, these line projections form three right angles at the fourth target point. A photodetector image plane obtains images of the target points projected through a lens located a fixed distance from the image plane. Simple algebraic manipulation of the position coordinates of the images on the image plane corresponding to the target points establishes a vector replica of the target points thereby providing sufficient data to provide a six degrees-of-freedom tracking solution including object position and object orientation.

DESCRIPTION OF THE INVENTION

Figure 1:
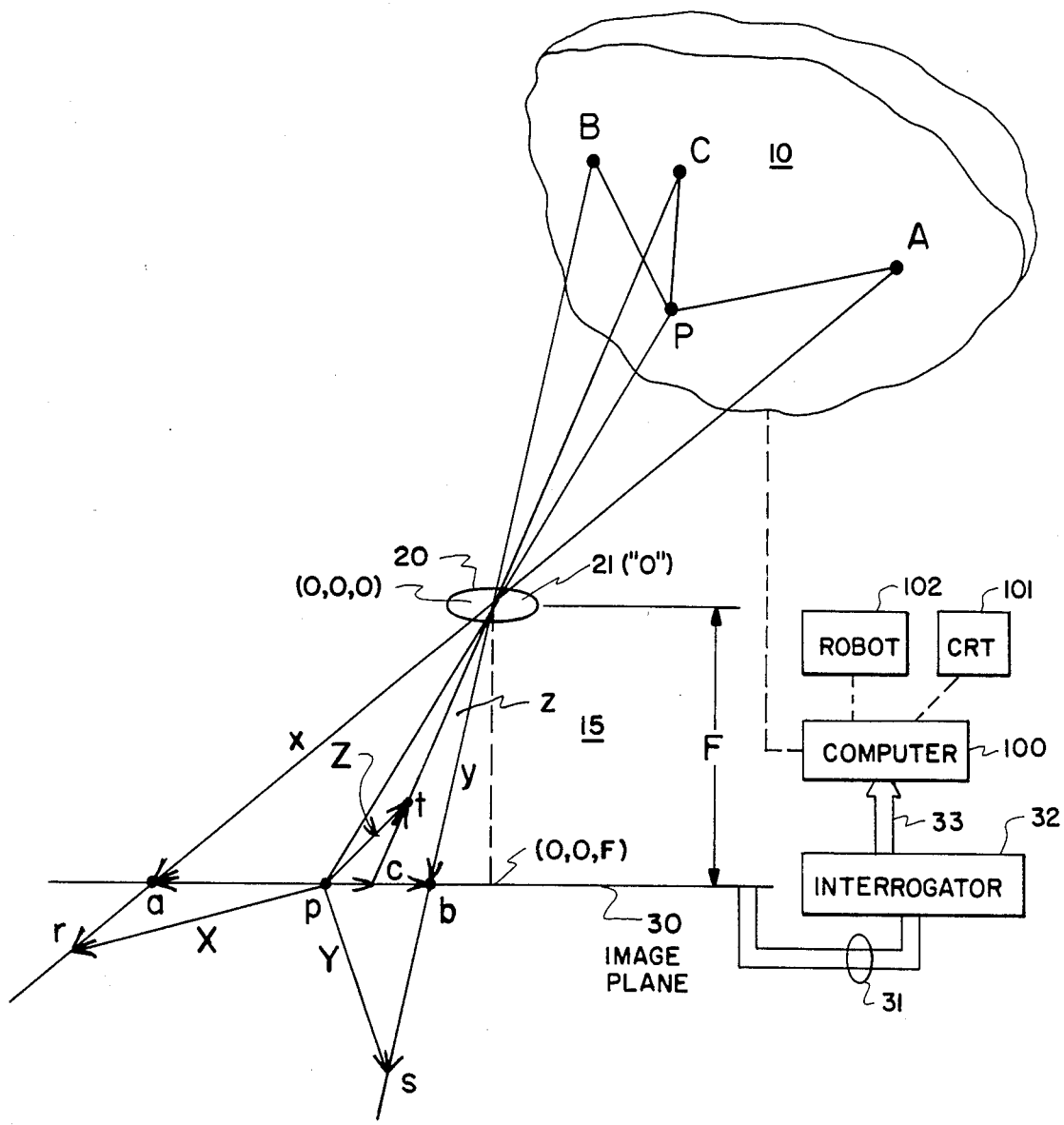
FIG. 1 is a combination imaging means and vector diagram illustrating the principles of the invention.

FIG. 1 serves to provide a simple vector diagram and schematic diagram illustrating the principles of the invention. There shown is an object 10 having four identifiable target points, A, B, C and P, in fixed relationship to object 10. The target points may be provided, by way of an example, by illuminated painted spots on the object having median center points A, B, C and P. The spots may also be sources of light and the like. For purposes of the following discussion, the target points are considered to have no dimension.

Also shown in FIG. 1 is an imaging means 15, such as a camera and the like, comprising a lens 20 a fixed distance, F, above a photoplane or image plane 30. The system as just described is provided for the purpose of obtaining "image points" on the image plane corresponding to the "target points" projected thereon through the optical centerpoint "0" indicated by numeral 21 of the lens 20. The camera system may be provided by a variety of techniques including a pin hole instead of a lens. Image plane 30 is intended to coincide with a two-dimensional array of radiation or light sensitive elements (not shown) such as charge coupled devices, photodiodes, and the like. Connected to these elements are electrical conductors 31. The elements may be scanned by an interrogator 32, through conductors 31, to determine the response of the light sensitive elements. Interrogator 32, through scanning of the array of light sensitive elements via conductors 31, provides signals 33 representative of the position coordinates of the image points on the image plane. Imaging means 15, as just described, is well known in the art and is described in, among others, the aforementioned U.S. Pat. Nos. 4,396,945 and 4,238,828.

In the diagram of FIG. 1, the origin is defined as the optical centerpoint 21 of lens 20, the Z-axis as normal to the image plane, and the X-axis and Y-axis parallel to the image plane and being mutually perpendicular. In the following discussion, Roman letters are used as point labels and also denote position vectors of the points relative to the lens origin. Further, Greek letters indicate scalar multipliers. As a further convenience, target point vectors are defined as running from the origin to the target point, and the image point vectors as running to the origin from the image point. The intersection of the image plane and a line perpendicular to the image plane and passing through the optical centerpoint "0" defines the (0,0) coordinate of the image plane and has coordinates (0,0,F) relative to the origin 21.

In the invention of the present application, imaging means 15 generates signals 33 representative of the position coordinates of the image points "a", "b", "c", and "p". The position coordinates of a, b, c and p describe the vectors a, b, c and p relative to the optical centerpoint 21. Image points a, b, c and p are those images points projected on the image plan 30 from the target points A, B, C and P on object 10. Position coordinate information of the image points on the image plane may be provided by a variety of scanning techniques well known in the art. However, it is imperative in the practice of the invention to obtain the position coordinate of a median point on the image plane of the image spot produced thereon through the imaging means optics. The greater the resolution the greater will be the tracking accuracy.

In the present invention the four target points, A, B, C and P, are configured such that the three angles at P namely APB, APC and BPC are all right angles. For convenience, assume that the lengths of AP, BP and CP are known and equal although (as will become apparent) it makes no difference to the solution. The four target points projected through the "optical centerpoint", 21, of the camera produce image spots having median image points a, b, c and p on the camera image plane 30.

The present invention is not limited to a single four-point target group as just described. It is applicable to the case of three separated pairs of points (i) where there exists unique first, second, and third line projections passing through three pairs of points, respectively, (ii) where the three line projections are mutually orthogonal, (iii) where the three line projections, or parallel translations thereof, intersect at a common intersection point, and (iv) where there exists known target point separations between the common intersection point and one of the target points on each of the line projections, or target point separation ratios.

It is important to note that the three line projections as indicated in "ii" above need not explicitly intersect at a common intersection point. That is, the line projections may be translated in such a way as to be parallel to a line projection which will form or at least be parallel to one that will form implicitly a common intersect point with the other two line projections. This property may be of concern in some applications where it is in fact impossible to locate 4 points which form mutually orthogonal line projections at a common intersection point.

The eight position coordinates of the four image points give two degrees of overdeterminedness to the six-degree-of-freedom problem of finding the target range and attitude. The solution described herein uses the robust information comprised of three equations stating orthogonality between pairs of lines. After evaluating the quadratic coefficients and then solving the quadratic, the range and attitude are obtained by simple substitutions.

Conceptually, a scale replica of the target point array is centered around image point p. Specifically, the rectangularities of A, B, C and P are duplicated by finding points r, s, and t along the rays Oa, Ob and Oc, such that rps, rpt and spt are all right angles. This is achieved by making the three dot-products zero:

$$X \cdot Y = Y \cdot Z = X \cdot Z = 0, \quad (1)$$

where X, Y and Z are the vectors defined by pr, ps and pt and the "·" represents the vector dot product here and hereafter.

X, Y and Z may be represented as two-part vectorial sums:

$$X = a + \alpha x \quad (2)$$

$$Y = b + \beta y \quad (3)$$

$$Z = c + \gamma z, \quad (4)$$

where a, b and c are the vectors represented by pa, pb and pc, where x, y and z are the vectors represented by Oa, Ob and Oc, and where $\alpha$, $\beta$, and $\gamma$ are scalar multipliers to be determined.

Using equations 1 through 4, the orthogonality conditions are expressed by:

$$a \cdot b + \alpha(b \cdot x) + \beta(a \cdot y) + \alpha\beta(x \cdot y) = 0 \quad (5)$$

$$b \cdot c + \beta(c \cdot y) + \gamma(b \cdot z) + \beta\gamma(y \cdot z) = 0 \quad (6)$$

$$a \cdot c + \gamma(a \cdot z) + \alpha(c \cdot x) + \alpha\gamma(x \cdot z) = 0 \quad (7)$$

From equation (5), we get $\alpha$ expressed as a function of $\beta$:

$$\alpha = -(a \cdot b + \beta(a \cdot y))/(b \cdot x + \beta(x \cdot y)) \quad (8)$$

From equation (6), we get $\gamma$ as a function of $\beta$:

$$\gamma = -(b \cdot c + \beta(c \cdot y))/(b \cdot z + \beta(y \cdot z)) \quad (9)$$

Substituting in equation (7) by using equations (8) and (9), we get:

$$a \cdot c - (a \cdot z)(b \cdot c + \beta(c \cdot y))/(b \cdot z + \beta(y \cdot z)) - (c \cdot x)(a \cdot b + \beta(a \cdot y))/(b \cdot x + \beta(x \cdot y)) + (x \cdot z)(a \cdot b + \beta(a \cdot y))(b \cdot c + \beta(c \cdot y))/((b \cdot x + \beta(x \cdot y))(b \cdot z + \beta(y \cdot z))) = 0 \quad (10)$$

Through-multiplying by $(b \cdot x + \beta(x \cdot y))(b \cdot x + \beta(y \cdot z))$, collecting terms and rearranging, we get the quadratic equation in $\beta$:

$$\beta^2(C1) + \beta(C2) + C3 = 0 \quad (11)$$

Where:

$$C1 = (y \cdot z)((a \cdot c)(x \cdot y) - (a \cdot y)(x \cdot c)) + (c \cdot y)((a \cdot y)(x \cdot z) - (a \cdot z)(x \cdot y)) \quad (12)$$

$$C2 = (a \cdot c)((b \cdot x)(y \cdot z) + (b \cdot z)(x \cdot y)) + (x \cdot z)((a \cdot b)(c \cdot y) + (b \cdot c)(a \cdot y)) - (c \cdot x)((a \cdot b)(y \cdot z) + (a \cdot y)(b \cdot z)) - (a \cdot z)((b \cdot c)(x \cdot y) + (b \cdot x)(c \cdot y)) \quad (13)$$

$$C3 = (a \cdot b)((b \cdot c)(x \cdot z) - (c \cdot x)(b \cdot z)) + (b \cdot x)((a \cdot c)(b \cdot z) - (b \cdot c)(a \cdot z)) \quad (14)$$

If Cl is negative, change the signs of C1, C2 and C3. Then evaluate the solution for $\beta$, assuming that the cube-corner is seen as convex, rather than reentrant:

$$\beta = (SQRT(C2^{**}2 - 4^*C1^*C3) - C2)/(2^*C1) \quad (15)$$

where "*" is multiply, "**" is exponent, and SQRT is square root.

Next, $\alpha$ and $\gamma$ are readily found by substituting equation (15) into equations (8) and (9). Having $\alpha$, $\beta$ and $\gamma$, X, Y, and Z are then directly determined from equations (2), (3), and (4) using (i) the values of $\alpha$, $\beta$, and $\gamma$, (ii) vectors a, b, and c relative to point p, and (iii) vectors X, Y, and Z relative to the optical centerpoint. Vectors X, Y, and Z are scale replicas of the target point array of object space vectors PA, PB and PC.

The range or position vector OP is evaluated by multiplying the vector Op by an appropriate scale factor $\mu$.

For example:

$$\frac{L1}{|X|}, \frac{L2}{|Y|}, \text{ or } \frac{L3}{|Z|}$$

where L1, L2, and L3 are the known target point separations of PA, PB, and PC. Range, of course, is the magnitude of vector OP.

Since there may be some inconsistencies in position coordinate data due to noise, distortion, and the like, an averaging process may be used. For example, a scale factor μ may be defined as:

$$\mu = SQRT((L1^{}2 + L2^{}2 + L3^{}2)/(X^{}2 + Y^{}2 + Z^{}2))OP = \mu^{*}Op, \quad (16)$$

where L1, L2, and L3 are the known target point separations as before. This resolves, in a rational way, any inconsistencies in the relative lengths of X, Y and Z.

The attitude matrix (yaw, pitch, and roll) of the target point array is conveniently expressible as a 3-by-3 matrix, M, whose columns are unit vectors coinciding with X, Y and Z. Or, one may choose to postmultiply M by a constant rotation matrix, R, so as to define whatever "home" attitude is desired as the unit matrix (establishes a base reference coordinate frame). If so, R is the inverse of the value assumed by M at the "home" orientation.

The attitude matrix M is formed by dividing X, Y and Z by their respective magnitudes, and then arranging their components in the three columns of M.

$$M(1,1) = X(1)/XABS \quad M(1,2) = Y(1)/YABS \quad M(1,3) = Z(1)/ZABS$$

$$M(2,1) = X(2)/XABS \quad M(2,2) = Y(2)/YABS \quad M(2,3) = Z(2)/ZABS$$

$$M(3,1) = X(3)/XABS \quad M(3,2) = Y(3)/YABS \quad M(3,3) = Z(3)/ZABS$$

Note however, due to noise imperfections in the optical system and the resolution of the image point position coordinate information on the image plane, some deviation in the orthogonality of the vector replica of the target points may be present. In these circumstances, if the matrix M isn't quite orthogonal, it may be "squared up" using standard data-massaging procedures, such as least squares fit and the like.

Note that if the object body axes defined by PA, PB, and PC are in alignment with the reference coordinate frame, then the diagonal of the matrix M is "1", and all other values zero. As the object rotates in any direction, corresponding component values will appear in the matrix. In turn, the matrix M may be evaluated in a well known manner to arrive at the orientation of the object relative to the reference coordinate frame. The columns of matrix M represent the vector components described in inertial space relative to the selected coordinate reference frame defined by vectors X, Y, and Z.

Using the target point configuration of the present invention, the six-degrees-of-freedom solution is direct, without iteration. Furthermore, the ostensible solution ambiguity is easily resolved using conditions dictated by the viewability of the target. With a convexly-seen cube-corner point arrangement, the algebraically larger of the two quadratic solutions should be used.

As indicated earlier, an explicit 4-point cube-corner is not necessary. If there are 3 pairs of points which define an orthogonal trio of lines which intersect at a point, that suffices.

Figure 2:
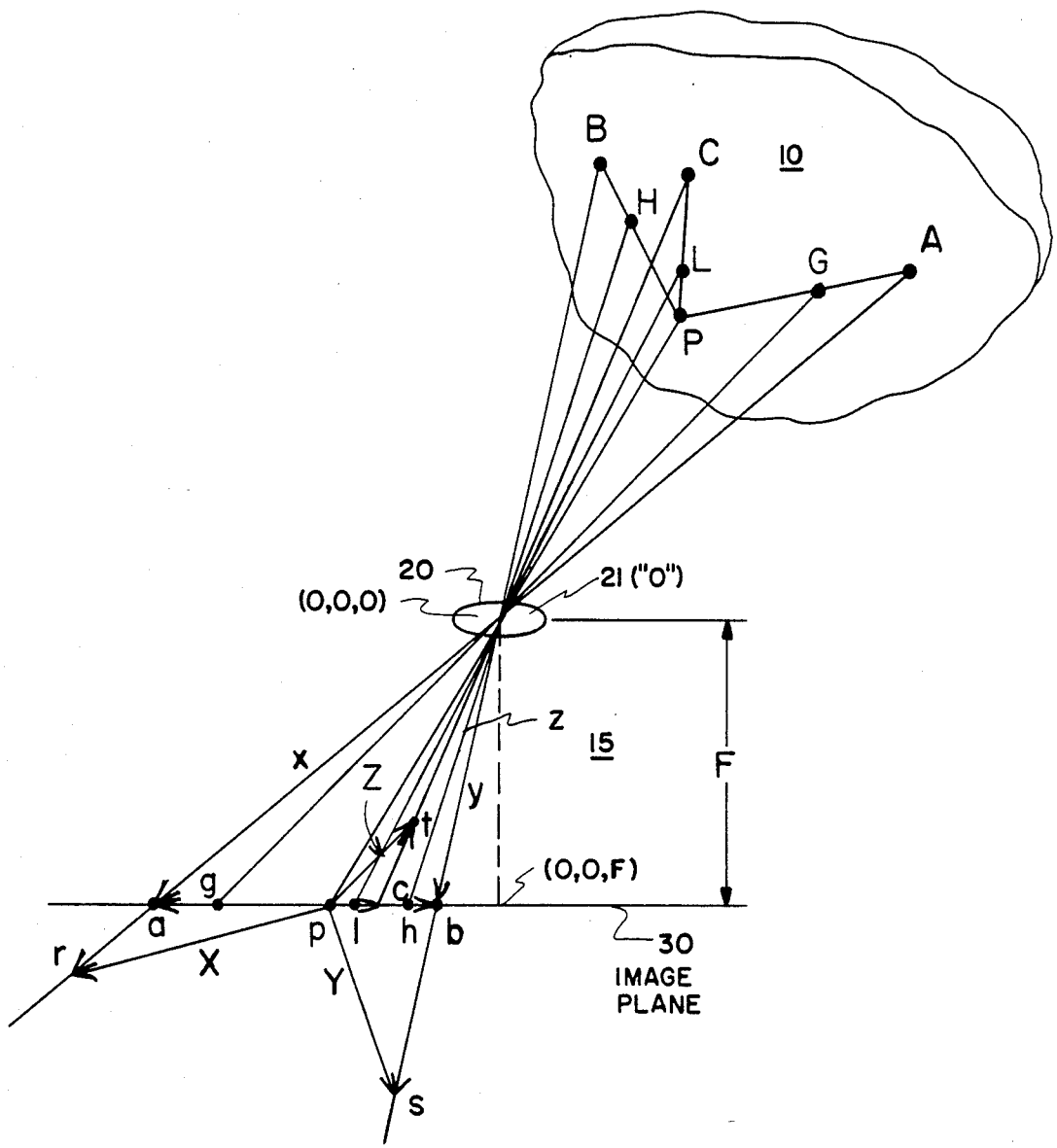
FIG. 2 shows another vector diagram also illustrating the principles of the invention.

FIG. 2 is like FIG. 1 with the addition of target points G, H, and L. Referring to FIG. 2, target points G, H, and L produce image points g, h, and l. Point P in FIG. 2 is defined to be the common intersection of a first line projection through points A and G, a second line projection through points B and H, and a third line through points C and L. Each of the line projections being perpendicular as before. From the position coordinates of image points a, b, c, g, h, and l, provided by imaging means 15 on image plane 30, the common image point p, may be synthesized using a linear analysis on the projection of image lines ag, bh, and cl. A least-squares fit, or the like, may be used if the three lines don't exactly meet. The position coordinates of the outer three image points, a, b, and c, and the synthetic point p, may be utilized in accordance with the analysis described above.

The computations demanded by the analysis presented above utilize the position coordinates of the image points. These computations may be performed by any arithmetic processor, such as a computer and the like, for carrying out the computations. FIG. 1 shows a computer 100 receiving signals 33 representative of the position coordinates of the image points for carrying out the computations for calculating vector replicas, direction vectors, and/or position and orientation calculations. The computer in turn may be coupled, for example, to a CRT 101 for numeric or pictorial displays, an independent robot 102 for control thereof in response to the position and orientation of the object 10, and/or the object 10 as part of a closed loop control system.

A six-degrees-of-freedom solution to the array of target points as illustrated in FIG. 1 may alternatively be provided by use of a closed-form approximation. Assume that object 10 has body axes I, J, and K in alignment with i, j, and k axes of a reference coordinate frame. An attitude matrix to describe the orientation of the object body axes relative to the reference coordinate frame is as follows:

$$\begin{vmatrix} M1 & M4 & M7 \\ M2 & M5 & M8 \\ M3 & M6 & M9 \end{vmatrix} \quad (A1)$$

As a point of information, the column values M1, M2, and M3 represent the direction cosines (or components) of a direction vector aligned with the I-body-axis of the object resolved along the reference coordinate frame axes. The row values M1, M4, and M7 represent the direction cosines of a direction vector aligned with i-axis of the reference coordinate frame resolved along the object coordinate frame axes. In a similar fashion, the remaining columns and rows represent direction vectors related to the J and K, and the j and k axes, respectively, of the object and reference coordinate frame, respectively. Each of the direction vectors is, of course, a unit vector.

The orthogonally arranged target point coordinates in inertial space relative to the reference coordinate frame are defined as:

$$P = (O, O, O) \quad (A2)$$

$$A = (O, S, O)$$

$$B = (S, O, O)$$

$$C = (O, O, S)$$

where S is the target point separation from point P.

The coordinates of the target point array relative to the reference coordinate frame after rotation and translated by Tx, Ty, Tz, become:

$$P' = (Tx, Ty, Tz) \quad (A3)$$

$$A' = (M4' + Tx, M5' + Ty, M6' + Tz)$$

-continued $$B' = (M1' + Tx, M2' + Tx, M3' + Tz)$$

$$C' = (M7' + Tx, M8' + Ty, M9' + Tz)$$

where the "primed" Mi's are the attitude matrix values multiplied by the scalar S, and A', B', C', and P' are the translated and rotated target points.

If the camera is assured to be looking straight at point P of the object, the ratio of the image point coordinate to camera focal length (F) is equal to the ratio of the corresponding target point position coordinate (X or Y coordinates relative to the coordinate frame of the optical centerpoint 21 and image plane 30) to the Z-axis distance of the target point from the optical center point. In these circumstances:

$$x_p \frac{Tx}{Tz} \quad y_p = \frac{Ty}{Tx}$$

$$x_a = \frac{M4' + Tx}{M6' + Tz} \quad y_a = \frac{M5' + Ty}{M6' + Tz}$$

$$x_b = \frac{M1' + Tx}{M3' + Tz} \quad y_b = \frac{M2' + Ty}{M3' + Tz}$$

$$x_c = \frac{M7' + Tx}{M9' + Tz} \quad y_c = \frac{M8' + Ty}{M9' + Tz}$$

where the values "$x_i$" and "$y_i$" are the image plane position coordinates divided by the optical center point distance F from the image plane.

If the camera is pointing at target point P such that $x_p = y_p = 0$, then Tx and Ty=0. Images not meeting this criterion can be transformed into images that do. Thus, for simplicity, Tx=Ty=0 in the following discussion. Therefore, $$x_p = \frac{Tx}{Tz} \quad y_p = \frac{Ty}{Tz}$$

$$x_a = \frac{M4'}{M6' + Tz} \quad y_a = \frac{M5'}{M6' + Tz}$$

$$x_b = \frac{M1'}{M3' + Tz} \quad y_b = \frac{M2'}{M3' + Tz}$$

$$x_c = \frac{M7'}{M9' + Tz} \quad y_c = \frac{M8'}{M9' + Tz}$$

The approximation of the solution is that S is much smaller than Tz. Therefore:

$$M3' + Tz \approx Tz$$

$$M6' + Tz \approx Tz$$

$$M9' + Tz \approx Tz$$

Note that the approximation just presented is such that as Tz becomes smaller (i.e. closer to the optical center point) the solution degrades in resolution.

Thus (A4) can be approximated as:

$$x_a = \frac{M4'}{Tz} \quad y_a = \frac{M5'}{Tz} \quad (A5)$$

$$x_b = \frac{M1'}{Tz} \quad y_b = \frac{M2'}{Tz}$$

$$x_c = \frac{M7'}{Tz} \quad y_c = \frac{M8'}{Tz}$$

Then from (A5):

$$M1 = \frac{x_b Tx}{S} \quad M4 = \frac{x_a Tz}{S} \quad M7 = \frac{x_c Tz}{S} \quad (A6)$$

$$M2 = \frac{y_b Tz}{S} \quad M5 = \frac{y_a Tz}{S} \quad M8 = \frac{y_c Tz}{S}$$

since $M_i' = (M_i)(S)$ as noted above.

Since each row and column represent components of a unit vector, the components have the rotation matrix property:

$$(M1)^2 + (M4)^2 + (M7)^2 = 1$$

and $$(M2)^2 + (M5)^2 + (M8)^2 = 1$$

Thus:

$$(M1)^2 + (M2)^2 + (M4)^2 + (M5^2) + (M7)^2 + (M8)^2 = 2$$

Substituting equation (A6) into the identity above:

$$\frac{Tz^2}{S^2} \{x_a^2 + y_a^2 + x_b^2 + y_b^2 + x_c^2 + y_c^2\} = 2 \quad (A7)$$

$$Tz = S \sqrt{\frac{2}{x_a^2 + y_a^2 + x_b^2 + y_b^2 + x_c^2 + y_c^2}}$$

The value "Tz" in equation (A7) is the range of point P, and the object from the optical center point. The rotation matrix values of equation (A6) may be solved by substituting the ratio Tz/S from equation (A7).

The values M3, M6, and M9 may be solved by recognizing that the third orthogonal axis may be determined by the cross product of the direction vector aligned with the first reference coordinate axis described by M1, M4, and M7 and the direction vector aligned with the second reference coordinate axis described by M2, M5, and M8. Accordingly, $$M3 = (M4)(M8) - (M5)(M7)$$

$$M6 = (M2)(M7) - (M1)(M8)$$

$$M9 = (M1)(M5) - (M2)(M4)$$

Like the first exact solution presented earlier, noise imperfections in the optical system and resolution of image point position coordinate information on the image plane may lead to some deviation in the orthogonality of the vector replica of the target points. In these circumstances, if the matrix, equation (A1), isn't quite orthogonal, it may be "squared up", as before, using standard data massaging procedures such as least squares fit, and the like.

The attitude matrix computations may be performed by computer 100 of FIG. 1. Having solved for the attitude matrix, equation (A6), six-degrees-of-freedom tracking is processed in the conventional manner.

From the above it will be evident that the invention comprises an optical system employing (i) at least three target points having a right angle arrangement with respect to a fourth point and are fixed in relationship to an object, (ii) an imaging means having an image plane defining a reference coordinate system with a field of view including the target points for obtaining image points on the image plane corresponding to the target points projected thereon, (iii) imaging means providing position coordinate information of each image point, and (iv) a computational device for processing the position coordinate information in a predetermined manner so as to allow determination of position and orientation of the object relative to a reference coordinate system. The present invention may utilize either an exact or approximate six-degrees-of-freedom tracking solution of the target point array. The present invention provides for a means for determining a vector replica of the target point arrangement to facilitate the tracking solution. The vector replica in turn provides sufficient information for obtaining position and orientation (pitch, yaw, and roll) of the object i.e. six degrees-of-freedom tracking system.

A method and means for synthesizing an image point corresponding to a common intersection point about which the right angle arrangement of the three target points is defined has also been shown.

It will be evident to those skilled in the art that the target points may be simple spots which may be painted on the object, or projected onto an object from a light source and the like. The imaging system may also be provided by a wide range of optical systems for obtaining the position coordinates of the image points corresponding to the target points. The greater the resolution of obtaining the image points the greater will be the accuracy of the orientation measuring system.

Nevertheless, changes may be made in detail especially in matters of shape, size, and arrangment of the parts, within the principles of the invention, to the full extent indicated by the broad general meaning of the terms in which the independent claims are expressed.

What is claimed is:

1. A method of determining spatial information about an object relative to a reference coordinate frame, the method comprising:
   providing an identifiable target point array in fixed relationship to said object, said target point array having,
   first and second target points defining a first target point pair lying along a projection of a first line,
   third and fourth target points defining a second target point pair lying along a projection of a second line, and
   fifth and sixth target points defining a third target point pair lying along a projection of a third line, and
   wherein the extension of said first, second, and third line projections define, at least implicitly, three right angles at a common intersection point of said first, second, and third line projections;
   determining position coordinates of first, second, and third pairs of image points on said image plane corresponding to projections of said first, second, and third target point pairs on said image plane, respectively; and
   determining the orientation of said object as a function of said position coordinates of said image points.

2. The method of claim 1 further comprising the step of determining position coordinates on said image plane of a reference image point corresponding to said common intersection point.

3. The method of claim 2 further comprising the steps of:
   determining a first coefficient as a function of said position coordinates of said image points;
   determining a second coefficient as a function of said position coordinates of said image points;
   determining a third coefficient as a function of said position coordinates of said image points;
   determining a first direction vector in alignment with said first line projection as a function of (i) the product of said first coefficient and a vector describing a first image point, corresponding to said first target point, relative to an optical centerpoint through which said projections of target points pass, and (ii) a vector describing said first one of said image points relative to said reference image point;
   determining a second direction vector in alignment with said second line projections as a function of (i) the product of said second coefficient and a vector describing a second image point, corresponding to said third target point, relative to said optical centerpoint, and (ii) a vector describing said second one of said image points relative to said reference image point;
   determining a third direction vector in alignment with said third line projection as a function of (i) the product of said third coefficient and a vector describing a third image point, corresponding to said fifth target point, relative to said optical centerpoint, and (ii) a vector describing said third one of said image points relative to said reference image point;
   determining said target plane orientation from said first, second, and third direction vectors.

4. The method of claim 3 further comprising the step of determining the position of said object relative to said reference coordinate frame as a function of said first, second, and third direction vectors and at least one known target point separation between said common intersection point and one of said target points.

5. The method of claim 3 including the step of determining the position of said reference image point from said position coordinates of said image point pairs.

6. The method of claim 3 further comprising the step of correcting orthogonal deviations between said first, second, and third direction vectors.

7. The method of claim 1 wherein said second, fourth, and sixth target points are said common intersection point.

8. The method of claim 7 further comprising the steps of:
   determining a first coefficient as a function of squared position coordinate values of said image points; and
   generating a rotation matrix having matrix values being a function of the product of said first coefficient and said position coordinates of said image points.

9. The method of claim 8 further comprising the step of determining the position of said object relative to said reference coordinate frame as a function of said first coefficient and at least one known target point separation between said common intersection point and one of said target points.

10. The method of claim 1 further comprising the step of determining the position of said object relative to said reference coordinate frame from said position coordinates of said image points and at least one known target point separation between said common intersection point and one of said target points.

11. The method of claim 1 further comprising the step of determining position coordinates of a reference image point corresponding to the common intersection point of fourth, fifth, and sixth line projections passing through said first, second, and third image point pairs.

12. An apparatus for obtaining spatial information about an object relative to a reference coordinate frame comprising:

at least first, second, third and fourth target spots fixed in relation to said object, each of said target spots having a median point defining first, second, third and fourth target points, said fourth target point forming a common intersection point with first, second, and third line projections which pass separately through said first, second, and third target points, respectively, and said line projections forming, at least implicitly, three right angls at said fourth target point;

imaging means having a field of view including said target spots, said imaging means including an image plane for obtaining image spots corresponding to projections thereon of said target spots;

first means for determining position coordinates of a median image point of each image spot; and second means for determining the orientation of said object as a function of said position coordinates of said image points.

13. The apparatus of claim 12 wherein said second means determines position coordinates of a reference image point corresponding to said common intersection point.

14. The apparatus of claim 13, wherein said second means determines (i) a first coefficient as a function of said position coordinates of said image points, (ii) a second coefficient as a function of said position coordinates of said image points, (iii) a third coefficient as a function of said position coordinates of said image points, (iv) a first direction vector in alignment with said second line projection as a function of (i) the product of said second coefficient and a vector describing a second image point, corresponding to said first target point, relative to an optical centerpoint through which said projections of target points pass and, (ii) a vector describing said second one of said image points relative to a reference image point in said image plane corresponding to said common intersection point, (v) a second direction vector in alignment with said first line projection as a function of (i) the product of said first coefficient and a vector describing a second image point, corresponding to said second target point, relative to said optical centerpoint and, (ii) a vector describing said second image point relative to said reference image point, (vi) a third direction vector in alignment with said third line projection as a function of (i) the product of said third coefficient and a vector describing a third image point, corresponding to said third target point, relative to said optical centerpoint and, (ii) a vector describing said third image point relative to said reference image point, and (vii) said object orientation from said first, second, and third direction vectors.

15. The apparatus of claim 14 wherein said second means corrects orthogonal deviations between said first, second, and third direction vectors.

16. The apparatus of claim 12 wherein said second means determines the position of said object relative to said reference coordinate frame from said position coordinates of said image points and at least one known target point separation between said common intersection point and one of said target points.

17. An apparatus for obtaining spatial information about an object relative to a reference coordinate frame:

a target spot array in fixed relationship to said object, said target spot array including, first and second target spots, each having a median point thereof defining a first target point pair lying along a projection of a first line, third and fourth target spots each having a median point thereof defining a second target point pair lying along a projection of a second line, and fifth and sixth target each having a median point thereof defining a third target point pair lying along a projection of a third line, and wherein the extension of said first, second, and third line projections form, at least implicity, three right angles at a common intersection point of said first, second, and third line projections;

imaging means with a field of view including said target spots, said imaging means including an image plane for obtaining image spots corresponding to projections thereof of said target spots;

first means for determining position coordinates of a median image point of each image spot corresponding to said target points; and second means for determining the orientation of said object as a function of said position coordinates of said image points.

18. The method of claim 17 wherein said second means determines the position coordinates of a reference image point corresponding to said common intersection point.

19. The apparatus of claim 18 wherein said second means determines (i) a first coefficient as a function of said position coordinates of said image points, (ii) a second coefficient as a function of said position coordinates of said image points, (iii) a third coefficient as a function of said position coordinates of said image points, (iv) a first direction vector in alignment with said second line projection as a function of (i) the product of said second coefficient and a vector describing a first image point, corresponding to said first target point, relative to an optical centerpoint through which said projections of target point pass and, (ii) a vector describing said first image point relative to a reference image point in said image plane corresponding to said common intersection point, (v) a second direction vector in alignment with said first line projection as a function of (i) the product of said first coefficient and a vector describing a second image point, corresponding to said third target point, relative to said optical centerpoint and, (ii) a vector describing said second image point relative to said reference image point, (vi) a third direction vector in alignment with said third line projection as a function of (i) the product of said third coefficient and a vector describing said third image point relative to said optical centerpoint and, (ii) a vector describing said third one of said image points relative to said reference image point, and (vii) said object orientation from said first, second, and third direction vectors.

20. The apparatus of claim 19 wherein said second means resolves orthogonal deviations between said first, second, and third direction vectors.

21. The apparatus of claim 18 wherein said second means determines the position of said reference image point from the position coordinates of said image points.

22. The apparatus of claim 17 wherein said second means, determines a first coefficient as a function of squared position coordinate values of said image points; and generates a rotation matrix having matrix values being a function of the product of said first coefficient and said image point position coordinates.

23. The apparatus of claim 22 wherein said second means determines the position of said object relative to said reference coordinate frame as a function of said first coefficient and at least one known target point separation between said common intersection point and one of said target points.

24. The apparatus of claim 17 wherein said second means determines the position of said object relative to said reference coordinate frame from said position coordinates of said image points and at least one known target point separation between said common intersection point and one of said target points.

25. The apparatus of claim 17 wherein said second, fourth, and sixth target points provide said common intersection point.

26. The apparatus of claim 17 wherein said second means determines the position coordinates of a reference image point corresponding to the common intersection point of fourth, fifth, and sixth line projections passing through first, second, and third pairs of image points, respectively, corresponding to said first, second, and third target point pairs.

* * * * *